(12) United States Patent
Haehnle et al.

(10) Patent No.: US 12,487,930 B2
(45) Date of Patent: Dec. 2, 2025

(54) DYNAMIC ACCOUNTING OF CACHE FOR GPU SCRATCH MEMORY USAGE

(71) Applicant: Advanced Micro Devices, Inc., Santa Clara, CA (US)

(72) Inventors: Nicolai Haehnle, Munich (DE); Michael John Bedy, Groton, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 56 days.

(21) Appl. No.: 18/537,716

(22) Filed: Dec. 12, 2023

(65) Prior Publication Data

US 2025/0190347 A1 Jun. 12, 2025

(51) Int. Cl.
*G06F 12/0811* (2016.01)
*G06F 9/38* (2018.01)
*G06F 9/48* (2006.01)
*G06F 12/0871* (2016.01)
*G06F 12/0897* (2016.01)

(52) U.S. Cl.
CPC ........ *G06F 12/0811* (2013.01); *G06F 9/3851* (2013.01); *G06F 9/4843* (2013.01); *G06F 12/0871* (2013.01); *G06F 12/0897* (2013.01)

(58) Field of Classification Search
None
See application file for complete search history.

(56) References Cited

U.S. PATENT DOCUMENTS

| 11,875,197 | B2 | 1/2024 | Beckmann et al. |
| 2007/0150880 | A1 | 6/2007 | Mitran et al. |
| 2007/0198813 | A1 | 8/2007 | Favor et al. |
| 2007/0288909 | A1 | 12/2007 | Cheung et al. |
| 2009/0100249 | A1 | 4/2009 | Eichenberger et al. |
| 2013/0205123 | A1 | 8/2013 | Vorbach |
| 2014/0122841 | A1 | 5/2014 | Abernathy et al. |
| 2016/0026507 | A1 | 1/2016 | Muckle et al. |
| 2017/0053374 | A1 | 2/2017 | Howes et al. |

(Continued)

OTHER PUBLICATIONS

International Search Report and Written Opinion for International Application No. PCT/US2024/033367, mailed Oct. 10, 2024, 11 pp.

(Continued)

*Primary Examiner* — Kaushikkumar M Patel
(74) *Attorney, Agent, or Firm* — Kowert, Hood, Munyon, Rankin & Goetzel, P.C.; Rory D. Rankin

(57) ABSTRACT

An apparatus and method for efficiently scheduling wavefronts for execution on an integrated circuit. In various implementations, a computing system includes a parallel data processing circuit with multiple, replicated compute circuits. Each compute circuit executes one or more wavefronts. Each compute circuit includes a cache configured to store temporary data that cannot fit in the vector general-purpose register file of the compute circuit. Each wavefront requests a corresponding amount of storage space in the cache for storing the temporary data. When the available (Continued)

data storage space in the cache is less than a data size requested by a wavefront waiting to be dispatched, a control circuit of the compute circuit reduces a dispatch rate of wavefronts. The control circuit also reduces an issue rate of instructions of one or more dispatched wavefronts to assigned execution circuits of the compute circuit.

20 Claims, 9 Drawing Sheets

(56) References Cited

U.S. PATENT DOCUMENTS

| | | | |
|---|---|---|---|
| 2017/0220346 A1 | 8/2017 | Beckmann et al. | |
| 2018/0082470 A1* | 3/2018 | Nijasure | G06T 15/005 |
| 2018/0239604 A1 | 8/2018 | Cain, III et al. | |
| 2019/0206110 A1 | 7/2019 | Gierach et al. | |
| 2019/0266092 A1 | 8/2019 | Robinson et al. | |
| 2019/0278605 A1 | 9/2019 | Emberling et al. | |
| 2019/0324757 A1 | 10/2019 | Valerio et al. | |
| 2019/0332420 A1 | 10/2019 | Ukidave et al. | |
| 2019/0370059 A1* | 12/2019 | Puthoor | G06F 9/5038 |
| 2020/0065073 A1 | 2/2020 | Pan et al. | |
| 2020/0183697 A1 | 6/2020 | Targowski et al. | |
| 2020/0293369 A1* | 9/2020 | Maiyuran | G06F 9/38885 |
| 2021/0149673 A1 | 5/2021 | Li et al. | |
| 2021/0173796 A1* | 6/2021 | Puthoor | G06F 13/1668 |
| 2022/0100680 A1 | 3/2022 | Chrysos et al. | |
| 2022/0179787 A1* | 6/2022 | Koker | G06F 12/0862 |
| 2022/0206876 A1 | 6/2022 | Beckmann et al. | |
| 2022/0308884 A1* | 9/2022 | Øygard | G06F 11/3037 |
| 2023/0069890 A1* | 3/2023 | Kazakov | G06F 9/3888 |
| 2023/0102843 A1* | 3/2023 | Vishnuswaroop Ramesh | G06F 9/5016 718/104 |
| 2023/0289215 A1* | 9/2023 | Palmer | G06F 9/3004 |

OTHER PUBLICATIONS

Non-Final Office Action in U.S. Appl. No. 17/136,725, mailed Feb. 2, 2022, 8 pages.

Beckmann et al., U.S. Appl. No. 17/136,725, entitled "Dynamic Graphical Processing Unit Register Allocation", filed Dec. 29, 2020, 51 pages.

Jeon et al., "GPU Register File Virtualization", MICR0-48: Proceedings of the 48th International Symposium on Microarchitecture, Dec. 2015, pp. 420-432.

Kloosterman et al., "Regless: Just-In-Time Operand Staging for GPUs" MICR0-50 '17: Proceedings of the 5oth I\nnual IEEE/ACM International Symposium on Microarchitecture, Oct. 2017, pp. 151-164.

Vijaykumar et al., "Zorua: A Holistic Approach to Resource Virtualization in GPUs", 2016 49th Annual IEEE/ACM International Symposium on Microarchitecture (MICRO), Oct. 2016, 14 pages.

* cited by examiner

DYNAMIC ACCOUNTING OF CACHE FOR GPU SCRATCH MEMORY USAGE

BACKGROUND

Description of the Relevant Art

Highly parallel data applications are used in a variety of fields such as science, entertainment, finance, medical, engineering, social media, and so on. Machine learning data models, shader programs, and similar highly parallel data applications process large amounts of data by performing complex calculations at substantially high speeds. With an increased number of processing circuits in computing systems, the latency to deliver data to the processing circuits becomes emphasized. The performance, such as throughput, of the processing circuits depends on quick access to stored data. To support high-performance, the memory hierarchy transitions from relatively fast, volatile memory, such as registers on a processor die and caches either located on the processor die or connected to the processor die, to non-volatile and relatively slow memory. The interfaces and access mechanisms for the different types of memory also change.

The benefit of the memory hierarchy reduces when a cache in the hierarchy experiences contention such as capacity evictions. The evicted data is sent to other cache levels of the hierarchy causing an increase in the number of accesses of those caches. The increased number of accesses can cause evictions in those caches, which leads to increased cache contention. When one or more caches have contention above a threshold, the one or more caches are "thrashing." The cache contention across one or more caches increases latencies to retrieve requested data, which decreases performance. One cause of cache contention and capacity evictions is the amount of local data values used by iterative function calls increase during processing of the application. These local data values can be modified, and they are stored in a local cache. These local data values can be variables of stack data of a function call. As the amount of local data values increase, the local cache can no longer store all the data and capacity evictions occur.

In view of the above, efficient methods and mechanisms for efficiently scheduling wavefronts for execution on an integrated circuit are desired.

Figure 1:
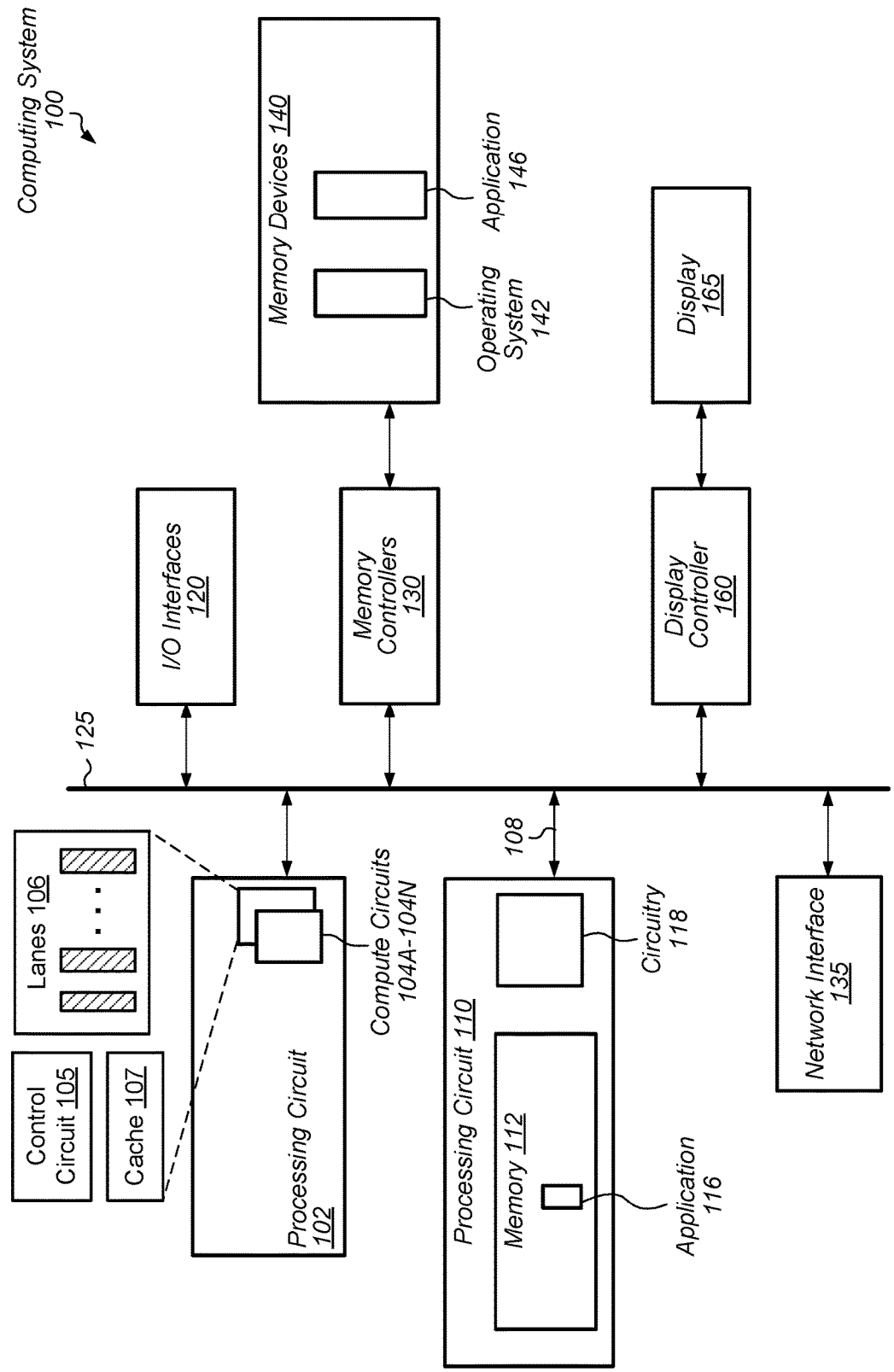
FIG. 1 is a generalized block diagram of a computing system that efficiently schedules wavefronts for execution on an integrated circuit.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods efficiently scheduling wavefronts for execution on an integrated circuit are contemplated. In various implementations, a computing system includes a processing circuit. In various implementations, the processing circuit is a parallel data processing circuit with a highly parallel data microarchitecture. The parallel data processing circuit includes multiple, replicated compute circuits, each with the circuitry of multiple lanes of execution. Each compute circuit executes one or more wavefronts. The cache is a local cache used to store temporary data that cannot fit in the vector general-purpose register file of the compute circuit. An example of the temporary data is stack data of a function call used by each wavefront that is generated based on the function call. Each wavefront requests a corresponding amount of storage space in the cache for storing the temporary data. This amount of storage space of the cache requested by a wavefront is referred to as a "reservation data size."

Each compute circuit includes a dispatch circuit that includes a queue for storing multiple wavefronts before the wavefronts are dispatched to the execution circuits of the compute circuits for execution. Each of the execution circuits is a single instruction multiple data (SIMD) circuit that includes multiple lanes of execution for executing a wavefront. Each compute circuit includes one or more SIMD circuits, and therefore, each compute circuit is able to execute one or more wavefronts. As used herein, the term "dispatch" refers to wavefronts being selected and sent from the dispatch circuit of the compute circuit to the SIMD circuits of the compute circuit. As used herein, the term "issue" refers to instructions of a wavefront in a compute circuit being selected and sent to the multiple lanes of execution of one of the multiple SIMD circuits of the compute circuit. The compute circuit also includes a control circuit that monitors reservation data sizes requested by the multiple wavefronts to be allocated in the cache. The control circuit also monitors the available data storage space in the cache.

When the available data storage space in the cache is less than a reservation data size requested by a wavefront waiting to be dispatched, the control circuit reduces a dispatch rate of wavefronts from the dispatch circuit of the compute circuit to the SIMD circuits of the compute circuit. In an implementation, the control circuit pauses dispatch for all wavefronts waiting to be dispatched to the SIMD circuits. In some implementations, the control circuit reduces an issue rate of instructions of one or more dispatched wavefronts to the parallel lanes of execution of one or more of the multiple SIMD circuits of the multiple compute circuit. In an implementation, the control circuit pauses the issue of instructions of one or more wavefronts. In some implementations, the control circuit selects which wavefronts to pause and which wavefronts to continue being dispatched and executed based on a corresponding priority level. A corresponding priority level of a wavefront is based on one or more of an age of the wavefront, a quality of service (QOS) parameter of the wavefront, a corresponding reservation data size of the wavefront, a ratio of the corresponding reservation data size to the available data storage space in the cache, an application identifier, an application type, such as a real-time application, and so forth. Further details of these techniques to efficiently schedule wavefronts for execution on an integrated circuit are provided in the following description of FIGS. 1-9.

Turning now to FIG. 1, a generalized diagram is shown of an implementation of a computing system 100 that efficiently schedules wavefronts for execution on an integrated circuit. In an implementation, computing system 100 includes at least processing circuits 102 and 110, input/output (I/O) interfaces 120, bus 125, network interface 135, memory controllers 130, memory devices 140, display controller 160, and display 165. Processing circuits 102 and 110 are representative of any number of processing circuits which are included in computing system 100. In other implementations, computing system 100 includes other components and/or computing system 100 is arranged differently. For example, power management circuitry, and phased locked loops (PLLs) or other clock generating circuitry are not shown for ease of illustration. In various implementations, the components of the computing system 100 are on the same die such as a system-on-a-chip (SOC). In other implementations, the components are individual dies in a system-in-package (SiP) or a multi-chip module (MCM). A variety of computing devices use the computing system 100 such as a desktop computer, a laptop computer, a server computer, a tablet computer, a smartphone, a gaming device, a smartwatch, and so on.

In an implementation, the processing circuit 110 is a general-purpose central processing unit (CPU). In one implementation, processing circuit 102 is a parallel data processing circuit with a highly parallel data microarchitecture, such as a graphics processing unit (GPU). The processing circuit 102 can be a discrete device, such as a dedicated GPU (dGPU), or the processing circuit 102 can be integrated (an iGPU) in the same package as another processing circuit. Other parallel data processing circuits that can be included in computing system 100 include digital signal processing circuits (DSPs), field programmable gate arrays (FPGAs), application specific integrated circuits (ASICs), and so forth.

In various implementations, processing circuit 102 includes multiple compute circuits 104A-104N, each including similar circuitry and components such as the multiple, parallel computational lanes 106. In some implementations, the processing circuit 102 includes one or more single instruction multiple data (SIMD) circuits with each including the multiple, parallel computational lanes 106. Additionally, each of the compute circuits 104A-104N includes a control circuit 105 and a cache 107. In some implementations, the parallel computational lanes 106 (or parallel execution lanes 106 or lanes 106) operate in lockstep. In various implementations, the data flow within each of the lanes 106 is pipelined. Pipeline registers are used for storing intermediate results and circuitry for arithmetic logic units (ALUs) perform integer arithmetic, floating-point arithmetic, Boolean logic operations, branch condition comparisons and so forth. These components are not shown for ease of illustration. Each of the ALUs within a given row across the lanes 106 includes the same circuitry and functionality, and operates on a same instruction, but different data associated with a different thread. A particular combination of the same instruction and a particular data item of multiple data items is referred to as a "work item." A work item is also referred to as a thread.

The multiple work items (or multiple threads) are grouped into thread groups, where a "thread group" is a partition of work executed in an atomic manner. In some implementations, a thread group includes instructions of a function call that operate on multiple data items concurrently. Each data item is processed independently of other data items, but the same sequence of operations of the subroutine is used. As used herein, a "thread group" is also referred to as a "work block" or a "wavefront." Tasks performed by the parallel data processing circuit 102 can be grouped into a "workgroup" that includes multiple thread groups (or multiple wavefronts).

In an implementation, processing circuit 102 performs video rendering on an 8-pixel by 8-pixel block of a video frame. The corresponding 64 threads are grouped into two wavefronts with each wavefront including 32 threads or 32 work items. The hardware of a SIMD circuit includes 32 parallel lanes of execution. The hardware of a scheduler (not shown) assigns workgroups to the compute circuits 104A-104N. Each of the compute circuits 104A-104N includes a dispatch circuit that includes a queue for storing multiple wavefronts before the wavefronts are dispatched to the SIMD circuits that include the parallel lanes of execution lanes 106. Scheduling circuitry in the control circuit 105 of the assigned compute circuit of the compute circuits 104A-104N divides the received workgroup into two separate wavefronts, stores the two wavefronts in a dispatch circuit, and assigns each wavefront to a respective SIMD circuit. In other implementations, another number of threads and wavefronts are used based on the hardware configuration of the parallel data processing circuit 102.

In some implementations, cache 107 is a local cache used to store temporary data that cannot fit for storage in the vector general-purpose register file of the assigned compute circuit of the compute circuits 104A-104N. An example of the temporary data is stack data of a function call used by a corresponding wavefront and the stack data is generated based on the function call. In various implementations, the wavefront utilizes push instructions and pop instructions to access the stack data. This stack data is also referred to as "live state information." This live state information includes local variables of the corresponding wavefront, and this live state information does not include result data that can be accessed by other wavefronts after the corresponding wavefront completes. Therefore, data storage of this live state information is not maintained once the corresponding wavefront completes, whereas data storage of the result data is maintained once the corresponding wavefront completes.

Each wavefront requests a corresponding amount of storage space in cache 107 for storing the temporary data. This amount of storage space of the cache 107 requested by a wavefront is referred to as a "reservation data size." The stack data or other type of temporary data (live state information) stored in the storage space with a size of the reservation data size can be referred to as "scratch data." The wavefront includes an instruction that includes the requested reservation data size. In an implementation, this instruction of the wavefront includes the following type and format:
s_set_scratch_size <ssrc>

The argument "ssrc" of the above instruction includes an indication specifying the requested reservation data size. In some implementations, the argument is a positive integer indicating a data size in a default unit of bytes, kilobytes (KB), or other. In another implementation, the instruction uses a second argument that includes an indication specifying the unit of the requested reservation data size. In other implementations, another opcode is used for the instruction. The control circuit 105 monitors reservation data sizes requested by the multiple wavefronts to be allocated in cache 107. In some implementations, control circuit 105 calculates a sum of the reservation data sizes requested by the wavefronts that have been dispatched and are executing. Control circuit 105 calculates the remaining available amount of data storage space of cache 107 by subtracting this sum from the total available amount of data storage space provided by the size of cache 107.

In an implementation, control circuit 105 assigns a reservation data size requested by a wavefront waiting to be dispatched as a threshold. Control circuit 105 compares the remaining available amount of data storage space of cache 107 and the threshold. For example, when the remaining available amount of data storage space of cache 107 is less than the reservation data size requested by the wavefront waiting to be dispatched, the control circuit 105 reduces a dispatch rate of wavefronts from the dispatch circuit of the corresponding compute circuit to the SIMD circuits of the compute circuit. In some implementations, control circuit 105 also reduces the issue rate of instructions of one or more wavefronts within corresponding SIMD circuits. In an implementation, to reduce the issue rate, control circuit 105 pauses the issue of instructions of one or more wavefronts within corresponding SIMD circuits. When control circuit 105 pauses the issue of instructions of a wavefront, control circuit 105 stops issuing the instructions of the wavefront to a corresponding SIMD circuit.

In some implementations, control circuit 105 selects which wavefronts to reduce the dispatch rate and the issue rate and which wavefronts to maintain a currently used dispatch rate and issue rate based on a corresponding priority level. Control circuit 105 continues to reduce the dispatch rate and the issue rate of selected wavefronts until the remaining available amount of data storage space of cache 107 is greater than a threshold. The threshold can be a reservation data size requested by a wavefront waiting to be dispatched. The threshold can also be a data size value stored in a programmable configuration register. The threshold can also be a data size value corresponding to a particular percentage of the total data size of cache 107 where the percentage value is stored in a programmable configuration register. Alternatively, control circuit 105 continues to reduce the dispatch rate and the issue rate of selected wavefronts until control circuit 105 continues to reduce the dispatch rate and the issue rate of selected wavefronts until an external event occurs such as an external trap signal.

In other implementations, control circuit 105 monitors the actual remaining available data storage space in cache 107. One or more dispatched wavefronts can allocate an amount of data storage space in cache 107 during execution different from the reservation data size requested by the wavefront. Control circuit 105 decreases the actual remaining available data storage space in cache 107 each time a dispatched wavefront allocates data storage space for usage beyond the reservation data size requested by the wavefront. Therefore, the sum of the reservation data sizes requested by the wavefronts that have been dispatched can be different from the actual amount of allocated data storage space of cache 107.

When control circuit 105 determines the actual remaining available data storage space in cache 107 is less than a reservation data size requested by a wavefront waiting to be dispatched, the control circuit 105 reduces the dispatch rate of wavefronts from the dispatch circuit of the corresponding compute circuit to the SIMD circuits of the compute circuit. In an implementation, control circuit 105 also reduces the issue rate of instructions of one or more wavefronts within corresponding SIMD circuits. In some implementations, control circuit 105 selects which wavefronts to reduce the dispatch rate and the issue rate and which wavefronts to maintain a currently used dispatch rate and issue rate based on a corresponding priority level. A corresponding priority level of a wavefront is based on one or more of an age of the wavefront, a quality of service (QOS) parameter of the wavefront, a corresponding reservation data size of the wavefront, a ratio of the corresponding reservation data size to the available data storage space in the cache, an application identifier, an application type, such as a real-time application, and so forth.

In some implementations, control circuit 105 maintains a currently used dispatch rate and issue rate for wavefronts with higher priority levels, and control circuit 105 reduces the dispatch rate and issue rate for wavefronts with lower priority levels. In another implementation, control circuit 105 reduces the instruction issue rate or pauses instruction issue of a wavefront that most recently increased its data storage allocation of cache 107 beyond its requested reservation data size, which caused the remaining available amount of data storage space of cache 107 to be less than a first threshold. In other words, the wavefront that wavefront that most recently increased its data storage allocation of cache 107 caused the actual amount of allocated data storage space of cache 107 to be greater than a second threshold. In yet another implementation, control circuit 105 avoids reducing the dispatch rate and avoids reducing the instruction issue rate of the N oldest wavefronts in the processing circuit 102, where N is a positive, non-zero integer. Control circuit 105 reduces the dispatch rate and reduces the instruction issue rate (or pauses the dispatch of one or more pending wavefronts and/or pauses the instruction issue of dispatched wavefronts) of the youngest wavefronts in processing circuit 102 until the remaining available amount of data storage space of cache 107 is greater than the first threshold. Alternatively, control circuit 105 reduces the dispatch rate and reduces the instruction issue rate (or pauses the dispatch of one or more pending wavefronts and/or pauses the instruction issue of dispatched wavefronts) of the youngest wavefronts in processing circuit 102 until the actual amount of allocated data storage space of cache 107 is less than the second threshold.

In some implementations, control circuit 105 reduces the dispatch rate and reduces the instruction issue rate (or pauses the dispatch of one or more pending wavefronts and/or pauses the instruction issue of dispatched wavefronts) of wavefronts at a workgroup granularity. For example, control circuit 105 either reduces the dispatch rate and reduces the instruction issue rate of each wavefront of a particular workgroup, or control circuit 105 maintains dispatching wavefronts and issuing instructions of dispatched wavefronts of each wavefront of the particular workgroup at currently used rates. In other implementations, control circuit 105 selects wavefronts of a workgroup in a round-robin manner for reducing the dispatch rate and reducing the instruction issue rate (or pausing the dispatch of pending wavefronts and/or pausing the instruction issue of dispatched wavefronts). The duration of the time period that elapses before selecting another wavefront in the round-robin manner can be stored in a programmable configuration register. In some implementations, control circuit 105 performs selection of wavefronts of a workgroup using the round-robin manner when the number of workgroups within a compute circuit of compute circuits 104A-104N is less than a threshold number.

In yet other implementations, control circuit 105 selects wavefronts for reducing one or more of the dispatch rate and the issue rate using the round-robin manner at the larger granularity of a compute circuit of compute circuits 104A-104N, rather than within a workgroup. In various implementations, control circuit 105 stops reducing one or more of the dispatch rate and the issue rate of selected wavefronts within a workgroup when a barrier of the workgroup becomes active. Therefore, control circuit 105 returns to the previous dispatch rate and issue rate used prior to the applied reductions for each of the wavefronts of the workgroup. It is noted that the use of the instruction (e.g., s_set_scratch_size <ssrc>) that includes the requested reservation data size and the steps performed by control circuit 105 for reducing the dispatch rate and the issue rate do not cause cache lines of cache 107 to become reserved and avoid eviction. For example, memory access instructions are executed in the same, previous manner, and a particular region of cache 107 is not assigned to a dispatched wavefront where this particular region cannot have cache lines evicted until the dispatched wavefront completes. These cache lines can be evicted based on cache conflict misses and least-recently-used (LRU) and other cache replacement policies.

Although an example of a single instruction multiple data (SIMD) microarchitecture is shown for compute circuits 104A-104N, other types of highly parallel data microarchitectures are possible and contemplated. The high parallelism offered by the hardware of the compute circuits 104A-104N is used for real-time data processing. Examples of real-time data processing are rendering multiple pixels, image blending, pixel shading, vertex shading, and geometry shading. In such cases, each of the data items of a wavefront is a pixel of an image. The compute circuits 104A-104N can also be used to execute other threads that require operating simultaneously with a relatively high number of different data elements (or data items). Examples of these threads are threads for scientific, medical, finance and encryption/decryption computations.

In one implementation, the processing circuit 110 is a general-purpose processing circuit, such as a CPU, with any number of processing circuit cores that include circuitry for executing program instructions. Memory 112 represents a local hierarchical cache memory subsystem. Memory 112 stores source data, intermediate results data, results data, and copies of data and instructions stored in memory devices 140. For example, memory 112 stores the application 116, which is a copy of the application 144 stored in the memory devices 140. Processing circuit 110 is coupled to bus 125 via interface 108. Processing circuit 110 receives, via interface 108, copies of various data and instructions, such as the operating system 142, one or more device drivers, one or more applications such as application 146, and/or other data and instructions.

The processing circuit 110 retrieves a copy of the application 144 from the memory devices 140, and the processing circuit 110 stores this copy as application 116 in memory 112. One example of application 116 is a highly parallel data application such as a shader program. When the instructions of compiler 114 are executed by circuitry 118, circuitry 118 compiles application 116. As part of the compilation, circuitry 118 translates instructions of the application 116 into commands executable by the SIMD circuits of the compute circuits 104A-104N of the processing circuit 102. For example, when the instructions of the compiler 114 are executed by the circuitry 118, the circuitry 118 uses a graphics library with its own application program interface (API) to translate function calls of the application 116 into commands particular to the compute circuits 104A-104N of the processing circuit 102.

To change the scheduling of threads from the processing circuit 110 to the processing circuit 102, software development kits (SDKs) and application programming interfaces (APIs) were developed for use with widely available high-level languages to provide supported function calls. The function calls provide an abstraction layer of the parallel implementation details of processing circuit 102 such as the lanes 106 of the compute circuits 104A-104N. The details are hardware specific to the parallel data processing circuit 102 but hidden to the developer to allow for more flexible writing of software applications. When circuitry 118 executes the instructions of the compiler 114, the circuitry 118 compiles the generated second sequence of instructions into machine executable code for execution by the SIMD circuits of the compute circuits 104A-104N. An example of processing circuitry is a GPU such as the compute circuits 104A-104N of the processing circuit 102. The function calls in high level languages, such as C, C++, FORTRAN, and Java and so on, are translated to commands which are later processed by the hardware in processing circuit 102.

Platforms such as OpenCL (Open Computing Language), OpenGL (Open Graphics Library), OpenGL for Embedded Systems (OpenGL ES), and Vulkan provide a variety of APIs for running programs on GPUs from AMD, Inc. Developers use OpenCL for simultaneously processing the multiple data elements of the scientific, medical, finance, encryption/decryption and other computations while using OpenGL and OpenGL ES for simultaneously rendering multiple pixels for video graphics computations. Vulkan is a low-overhead, cross-platform API, open standard for three-dimensional (3-D or 3D) graphics applications. Further, DirectX is a platform for running programs on GPUs in systems using one of a variety of Microsoft operating systems.

In an implementation, when executing instructions of a kernel mode driver (KMD), circuitry 118 assigns state information for a command group generated by compiling the application 116. Examples of the state information are a process identifier (ID), a name of the application or an ID of the application, a version of the application, a compute/ graphics type of work, and so on. When executing instructions of the kernel mode driver, circuitry 118 sends the command group and state information to a ring buffer in the memory devices 140. The processing circuit 102 accesses, via the memory controllers 130, the command group and state information stored in the ring buffer. For wavefronts based on function calls to be executed, the number of variables to allocate, how to address the variables, and the number of vector registers used to allocate variables are needed. At least the stack data and the heap data determine data allocation.

Static data can be used to allocate statically declared objects, such as global variables and constants. A majority of these objects can be arrays. Stack can also be used to allocate scalar variables rather than arrays, such as local variables and parameters in the functions currently being invoked. Stack data can be grown and shrunk on procedure call or return, respectively. The heap data can be used to allocate dynamic objects accessed with pointers and are typically not scalar variables. The heap data can be used to reduce the frequency of copying the contents of strings and lists by storing the contents of temporary strings or lists during the string/list operations. The heap data is not affected by the return of the function call.

The processing circuit 102 schedules the retrieved commands to the compute circuits 104A-104N based on at least the state information. Other examples of scheduling information used to schedule the retrieved commands are age of the commands, priority levels of the commands, an indication of real-time data processing of the commands, and so forth. Besides the kernel mode driver (KMD), the computing system 100 uses other device drivers (drivers) 117 of a driver stack during the compilation and execution of application 144. The driver stack allows each driver to specialize in a particular type of function and decouples it from having to know about other drivers. Examples of the other drivers are user mode drivers, an input/output (I/O) interface of the operation system 142, and a file system driver.

In some implementations, computing system 100 utilizes a communication fabric ("fabric"), rather than the bus 125, for transferring requests, responses, and messages between the processing circuits 102 and 110, the I/O interfaces 120, the memory controllers 130, the network interface 135, and the display controller 150. When messages include requests for obtaining targeted data, the circuitry of interfaces within the components of computing system 100 translates target addresses of requested data. In some implementations, the bus 125, or a fabric, includes circuitry for supporting communication, data transmission, network protocols, address formats, interface signals and synchronous/asynchronous clock domain usage for routing data.

Memory controllers 130 are representative of any number and type of memory controllers accessible by processing circuits 102 and 110. While memory controllers 130 are shown as being separate from processing circuits 102 and 110, it should be understood that this merely represents one possible implementation. In other implementations, one of memory controllers 130 is embedded within one or more of processing circuits 102 and 110 or it is located on the same semiconductor die as one or more of processing circuits 102 and 110. Memory controllers 130 are coupled to any number and type of memory devices 140.

Memory devices 140 are representative of any number and type of memory devices. For example, the type of memory in memory devices 140 includes Dynamic Random Access Memory (DRAM), Static Random Access Memory (SRAM), NAND Flash memory, NOR flash memory, Ferroelectric Random Access Memory (FeRAM), or otherwise. Memory devices 140 store at least instructions of an operating system 142, one or more device drivers, and application 144. In some implementations, application 144 is a highly parallel data application such as a video graphics application, a shader application, or other. Copies of these instructions can be stored in a memory or cache device local to processing circuit 110 and/or processing circuit 102.

I/O interfaces 120 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices (not shown) are coupled to I/O interfaces 120. Such peripheral devices include (but are not limited to) displays, keyboards, mice, printers, scanners, joysticks or other types of game controllers, media recording devices, external storage devices, and so forth. Network interface 135 receives and sends network messages across a network.

Figure 2:
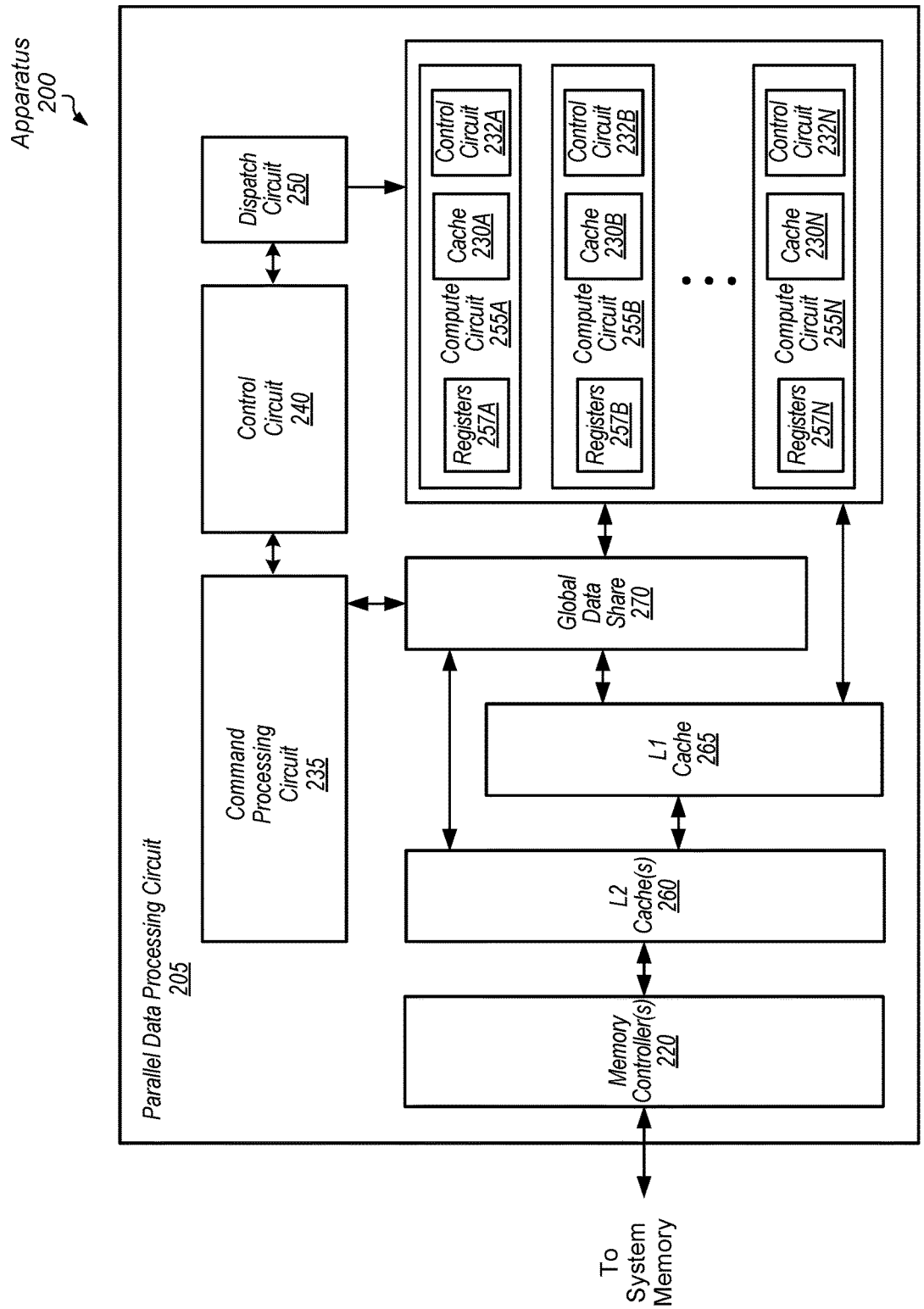
FIG. 2 is a generalized block diagram of an apparatus that efficiently schedules wavefronts for execution on an integrated circuit.

Turning now to FIG. 2, a block diagram of an implementation of an apparatus 200 is shown. In one implementation, apparatus 200 includes parallel data processing circuit 205 with an interface to system memory. In an implementation, the parallel data processing circuit 205 is a GPU. The apparatus 200 also includes other components which are not shown to avoid obscuring the figure. The parallel data processing circuit 205 includes at least the command processing circuit (or command processor) 235, control circuit 240, dispatch circuit 250, compute circuits 255A-255N, memory controller 220, global data share 270, shared level one (L1) cache 265, and level two (L2) cache 260. It should be understood that the components and connections shown for the parallel data processing circuit 205 are merely representative of one type processing circuit and does not preclude the use of other types of processing circuits for implementing the techniques presented herein.

In other implementations, the parallel data processing circuit 205 includes other components, omits one or more of the illustrated components, has multiple instances of a component even if only one instance is shown in the apparatus 200, and/or is organized in other suitable manners. Also, each connection shown in apparatus 200 is representative of any number of connections between components. Additionally, other connections can exist between components even if these connections are not explicitly shown in apparatus 200. In various implementations, the apparatus 200 executes any of various types of highly parallel data applications. As part of executing an application, a host CPU (not shown) launches kernels to be executed by the parallel data processing circuit 205. The command processing circuit 235 receives kernels from the host CPU and uses dispatch circuit 250 to dispatch wavefronts of these kernels to compute circuits 255A-255N.

Each of the compute circuits 255A-255N receives wavefronts from the dispatch circuit 250 and stores the received wavefronts in a corresponding local dispatch circuit (not shown). The control circuits 232A-232N schedule these wavefronts to be dispatched from the local dispatch circuits to SIMD circuits (not shown) of the compute circuits 255A-255N. One or more of the control circuit 240 and the control circuits 232A-232N include circuitry for dynamically allocating vector registers 257A-257N of vector general-purpose register files to wavefronts at call boundaries. In various implementations, each of the control circuits 232A-232N has the same functionality as the control circuit 105 (of FIG. 1). Each received wavefront stored in a corresponding local dispatch circuit requests a corresponding amount of storage space in one of the caches 230A-230N for storing temporary data (or scratch data or scratch memory). An example of the temporary data is stack data of a function call used by each wavefront that is generated based on the function call. Stack data can be used to allocate statically declared objects, such as global variables and constants. A majority of these objects can be arrays. Stack data can also be used to allocate scalar variables rather than arrays, such as local variables and parameters in the functions currently being invoked. Stack data can be grown and shrunk on procedure call or return, respectively.

When the remaining available data storage space in a corresponding one of the caches 230A-230N is less than a data size requested by a wavefront waiting to be dispatched from a local dispatch circuit, the corresponding one of the control circuits 232A-232N reduces a dispatch rate of wavefronts. The corresponding one of the control circuits 232A-232N also reduces an issue rate of instructions of one or more dispatched wavefronts to assigned SIMD circuits of the corresponding one of the compute circuits 255A-255N. Threads within wavefronts executing on compute circuits 255A-255N read and write data to corresponding caches of caches 230A-230N, vector registers 257A-257N, global data share 270, shared L1 cache 265, and L2 cache 260. It is noted that L1 cache 265 can include separate structures for data and instruction caches. It is also noted that global data share 270, shared L1 cache 265, L2 cache 260, memory controller 220, system memory, and caches 230A-230N can collectively be referred to herein as a "memory subsystem".

Figure 3:
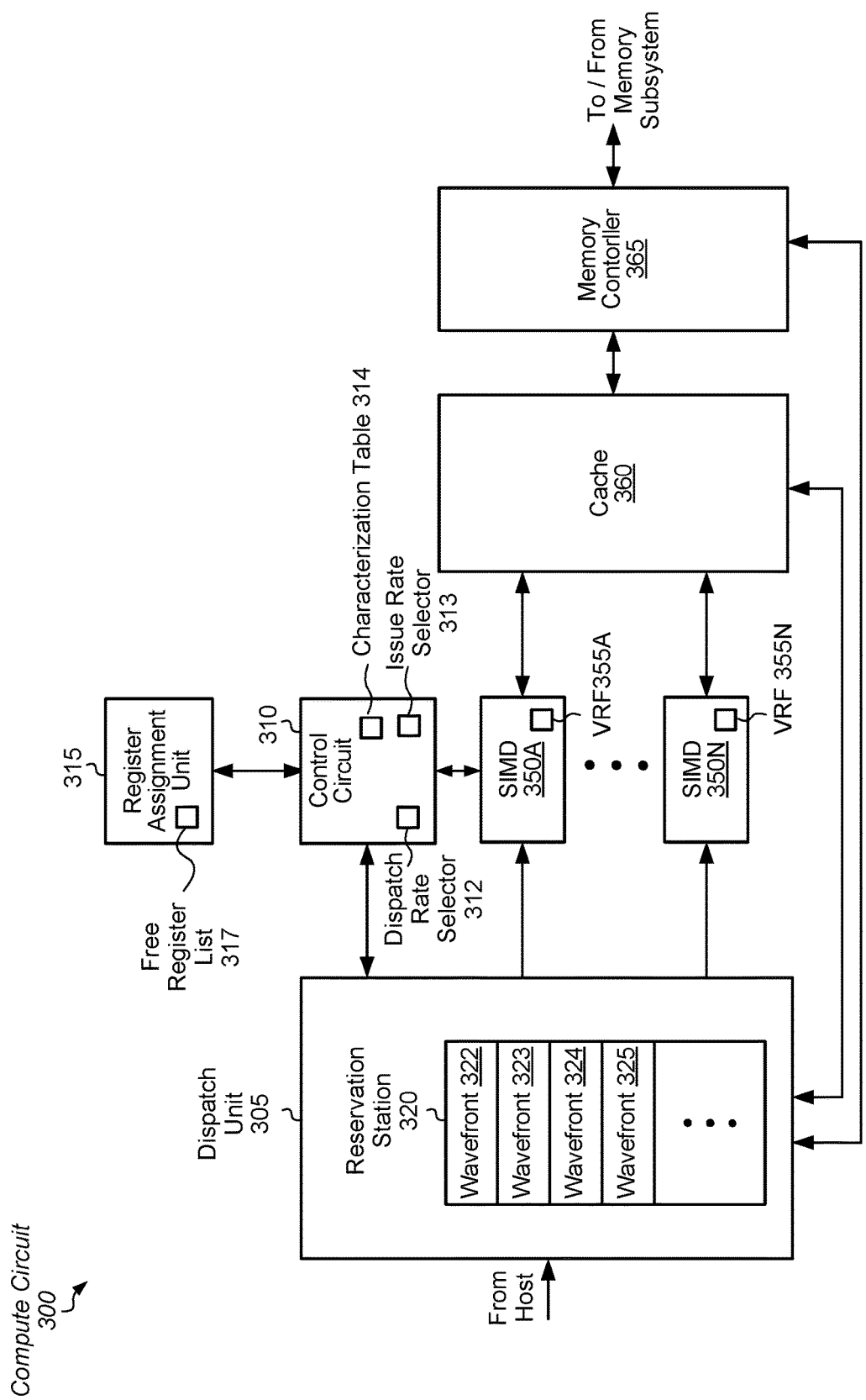
FIG. 3 is a generalized block diagram of an apparatus that efficiently schedules wavefronts for execution on an integrated circuit.

Referring now to FIG. 3, a block diagram of one implementation of a compute circuit 300 is shown. In one implementation, the components of compute circuit 300 are included within compute circuits 255A-255N of the parallel data processing circuit 205 (of FIG. 2). It should be understood that compute circuit 300 can also include other components, which are not shown to avoid obscuring the figure. Also, it is noted that the arrangement of components shown for compute circuit 300 are merely indicative of one particular implementation. In other implementations, compute circuit 300 can have other arrangements of components.

In one implementation, dispatch circuit 305 is a local dispatch circuit that receives wavefronts from an external dispatch circuit or external scheduler controlled by a command processing circuit (e.g., command processing circuit 235 of FIG. 2). The dispatch circuit 305 launches wavefronts on single instruction multiple data (SIMD) circuits 350A-350N based on control signals from the control circuit 310. SIMD circuits 350A-N are representative of any number of SIMD circuits, with the number varying according to the implementation. In one implementation, dispatch circuit 305 maintains a reservation station 320 to keep track of both pending wavefronts and in-flight wavefronts. As shown, reservation station 320 includes entries for wavefronts 322, 323, 324, and 325, which are representative of any number of both pending wavefronts and outstanding wavefronts. The number of outstanding wavefronts can vary during execution of an application.

In some implementations, the reservation station 320 stores the wavefronts as an ordered list where the wavefronts where the wavefronts are ordered according to their relative priority level. A corresponding priority level of a wavefront is based on one or more of an age of the wavefront, a quality of service (QOS) parameter of the wavefront, a corresponding reservation data size of the wavefront, a ratio of the corresponding reservation data size to the available data storage space in the cache, an application identifier, an application type, such as a real-time application, and so forth. In one implementation, when dispatch circuit 305 is getting ready to launch a next wavefront, dispatch circuit 305 queries control circuit 310 to determine an initial number of vector registers to allocate to the next wavefront. In this implementation, control circuit 310 queries register assignment circuit 315 when determining how to dynamically allocate vector registers at the granularity of the functions of wavefronts.

In one implementation, register assignment circuit 315 includes free register list 317 which includes identifiers (IDs) of the vector registers of vector register file (VRF) 355A-355N that are currently available for allocation. If there are enough vector registers available in free register list 317 for the next function of a wavefront, then control circuit 310 assigns these vector registers to the next wavefront. Otherwise, if there are insufficient vector registers available in free register list 317 for the next wavefront, it is possible for the control circuit 310 to stall the launch of the next wavefront. One or more of the register assignment circuit 315, the control circuit 310, and the reservation station 320 maintains a count of vector registers allocated to the wavefronts 322-325. For example, the control circuit 310 utilizes the characterization table 314 that stores information characterizing the execution of wavefronts.

The cache 360 is a local cache used to store temporary data that cannot fit in the vector register files 355A-355N of the compute circuit 300. An example of the temporary data is stack data of a function call used by each wavefront that is generated based on the function call. Each wavefront requests a corresponding amount of storage space (e.g., the reservation data size) in the cache 360 for storing the temporary data. In various implementations, control circuit 310 has the same functionality as the control circuit 105 (of FIG. 1) and the control circuits 232A-232N (of FIG. 2). The control circuit 310 monitors reservation data sizes requested by the multiple wavefronts to be allocated in the cache 360. The control circuit 310 also monitors the available data storage space in the cache 360. When the remaining available data storage space in the cache 360 is less than a reservation data size requested by a next wavefront of the wavefronts 322-325 waiting to be dispatched, the dispatch rate selector 312 of the control circuit 310 reduces a dispatch rate of wavefronts from the dispatch circuit 305 to the SIMD circuits 350A-350N.

When the remaining available data storage space in the cache 360 is less than a reservation data size requested by a next wavefront of the wavefronts 322-325 waiting to be dispatched, the issue rate selector 313 reduces an issue rate of instructions of one or more dispatched wavefronts to the parallel lanes of execution of one or more of the SIMD circuits 350A-350N. In various implementations, the dispatch rate selector 312 and the issue rate selector 313 utilize the information stored in the characterization table 314 when selecting an updated dispatch rate and an updated issue rate. In an implementation, the dispatch rate selector 312 pauses dispatch for all wavefronts waiting to be dispatched to the SIMD circuits 350A-350N. In other implementations, the dispatch rate selector 312 and the issue rate selector 313 select which wavefronts to pause and which wavefronts to continue being dispatched and executed based on a corresponding priority level. In yet another implementation, as described earlier regarding control circuit 105 (of FIG. 1), the dispatch rate selector 312 and the issue rate selector 313 select which wavefronts to pause and which wavefronts to continue being dispatched and executed based on whether wavefronts are part of a workgroup.

The memory controller 365 includes circuitry and queues for interfacing with one or more types of memory of the memory subsystem. For example, memory controller 365 supports a communication protocol with the one or more types of memory of the memory subsystem. It is noted that the arrangement of components such as dispatch circuit 305, control circuit 310, and register assignment circuit 315 shown in FIG. 3 is merely representative of one implementation. In another implementation, dispatch circuit 305, control circuit 310, and register assignment circuit 315 are combined into a single circuit. In other implementations, the functionality of dispatch circuit 305, control circuit 310, and register assignment circuit 315 can be partitioned into other circuits in varying manners.

Figure 4:
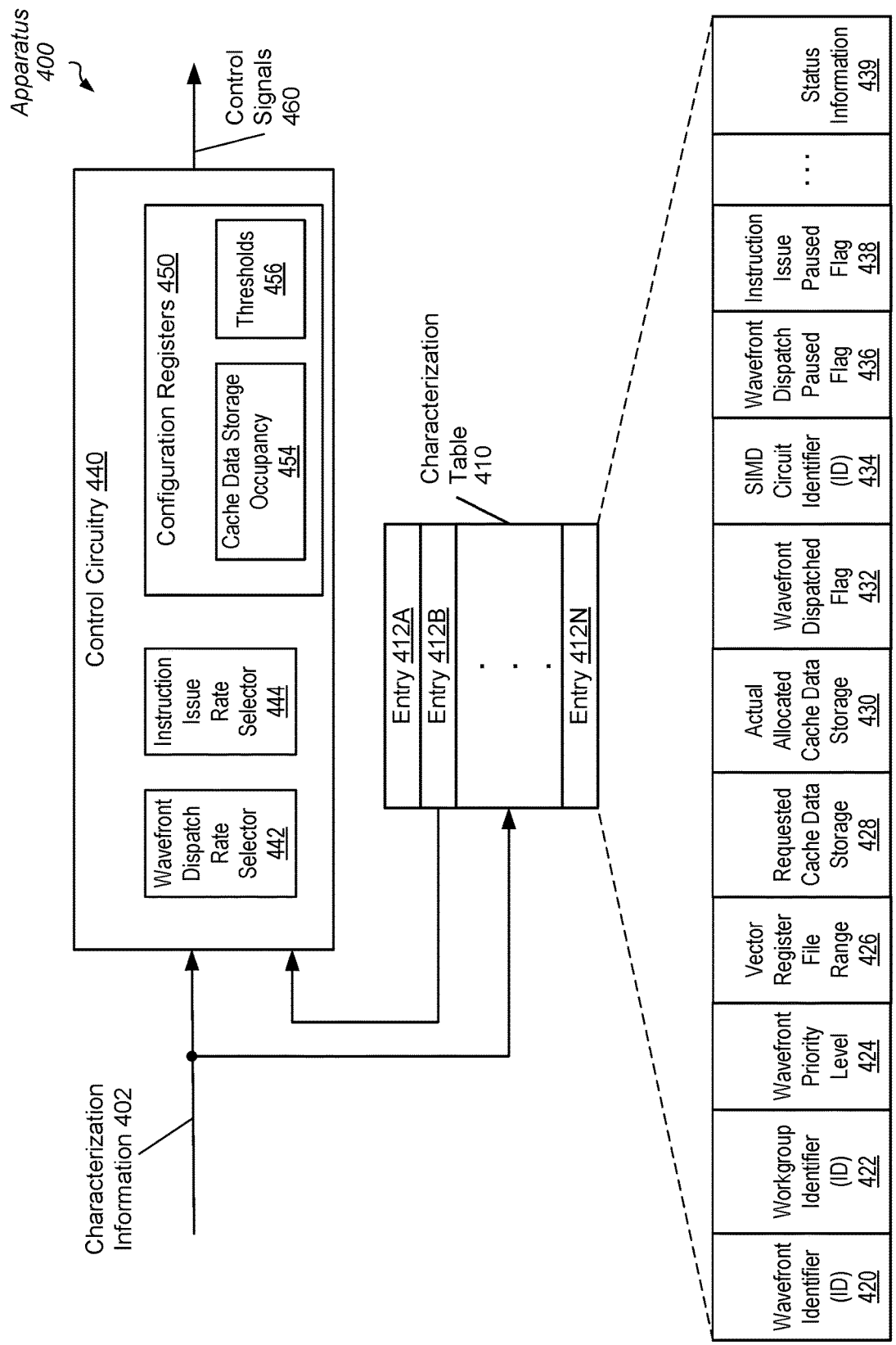
FIG. 4 is a generalized block diagram of an apparatus that efficiently schedules wavefronts for execution on an integrated circuit.

Referring to FIG. 4, a generalized block diagram is shown of an apparatus 400 that efficiently schedules wavefronts for execution on an integrated circuit. In the illustrated implementation, apparatus 400 includes control circuitry 440 and the characterization table 410 (or table 410). Table 410 stores information in entries 412A-412N. Each of these entries 412A-412N includes the fields 420-439. In various implementations, apparatus 400 has the same functionality as the control circuit 105 (of FIG. 1), the control circuits 232A-232N (of FIG. 2), and control circuit 310 (of FIG. 3). The control circuitry 440 receives the characterization information 402 and information from the table 410 and generates the control signals 460. The control circuitry 440 includes the wavefront dispatch rate selector 442, the instruction issue rate selector 444, and the configuration registers 450. The control signals 460 are used to update the dispatch rate of wavefronts from a local dispatch circuit of a compute circuit and update an instruction issue rate of SIMD circuits of the compute circuit.

Table 410 is implemented with one of flip-flop circuits, one of a variety of types of a random-access memory (RAM), a content addressable memory (CAM), or other. Although particular information is shown as being stored in the table entries (or entries) 412A-412N of table 410, and in a particular contiguous order, in other implementations, a different order is used, and a different number and type of information is stored. Field 420 stores a wavefront identifier (ID) and the field 422 stores a workgroup identifier. In some implementations, the information of one or more of the fields 420-439 is already stored in a reservation station of a local dispatch circuit, and the apparatus 400 relies on the data storage of this information in the reservation station, rather than in table 410. Field 424 stores a priority level of the wavefront. A corresponding priority level of a wavefront is based on one or more of an age of the wavefront, a quality of service (QOS) parameter of the wavefront, a corresponding reservation data size of the wavefront, a ratio of the corresponding reservation data size to the available data storage space in the cache, an application identifier or type, such as a real-time application, and so forth.

The field 426 stores a vector register file range for the corresponding wavefront. In some implementations, this information is stored in a register assignment circuit of the corresponding compute circuit. The field 428 stores the requested cache data storage for the corresponding wavefront. In some implementations, the wavefront includes an instruction that includes the requested reservation data size. In an implementation, this instruction of the wavefront includes the following type and format: s_set_scratch_size<ssrc>

The argument "ssrc" of the above instruction includes an indication specifying the requested reservation data size. In some implementations, the argument is a positive integer indicating a data size in a default unit of bytes, kilobytes (KB), or other. In another implementation, the instruction uses a second argument that includes an indication specifying the unit of the requested reservation data size. In other implementations, another opcode is used. Field 430 stores an actual allocated cache data storage for the corresponding wavefront. Field 432 stores a flag or other indication specifying whether the corresponding wavefront has been dispatched to a SIMD circuit. Field 434 stores an identifier of the assigned SIMD circuit. Field 436 stores a flag or other indication specifying whether the corresponding wavefront has dispatch paused. Field 438 stores a flag or other indication specifying whether the corresponding wavefront has instruction issue paused. The field 439 stores status information such as at least a valid bit.

The control circuitry 440 receives the characterization information 402. Characterization information 402 includes one or more of an application identifier (ID), a process identifier, a wavefront identifier, and so forth. Using the information stored in the configuration registers 450 and the table 410, the wavefront dispatch rate selector 442 determines a dispatch rate for one or more pending wavefronts. Additionally, the instruction issue rate selector 444 determines an instruction issue rate for one or more dispatched wavefronts. The configuration registers 450 include the register 454 for storing the cache data storage occupancy and the threshold registers 456 for storing one or more of data size thresholds, time period thresholds, and priority level thresholds. When the updated dispatch rate and instruction issue rate are generated, information specifying these updates is sent on control signals 460 to the dispatch circuit and corresponding SIMD circuits.

It is possible and contemplated that one or more of the processing circuits, the compute circuits, and apparatuses illustrated in FIGS. 1-3 are implemented as chiplets. As used herein, a "chiplet" is also referred to as an "intellectual property block" (or IP block). However, a "chiplet" is a semiconductor die (or die) fabricated separately from other dies, and then interconnected with these other dies in a single integrated circuit in the MCM. On a single silicon wafer, only multiple chiplets are fabricated as multiple instantiated copies of particular integrated circuitry, rather than fabricated with other functional blocks that do not use an instantiated copy of the particular integrated circuitry. For example, the chiplets are not fabricated on a silicon wafer with various other functional blocks and processors on a larger semiconductor die such as an SoC. A first silicon wafer (or first wafer) is fabricated with multiple instantiated copies of integrated circuitry a first chiplet, and this first wafer is diced using laser cutting techniques to separate the multiple copies of the first chiplet.

A second silicon wafer (or second wafer) is fabricated with multiple instantiated copies of integrated circuitry of a second chiplet, and this second wafer is diced using laser cutting techniques to separate the multiple copies of the second chiplet. The first chiplet provides functionality different from the functionality of the second chiplet. One or more copies of the first chiplet are placed in an integrated circuit, and one or more copies of the second chiplet is placed in the integrated circuit. The first chiplet and the second chiplet are interconnected to one another within a corresponding MCM. Such a process replaces a process that fabricates a third silicon wafer (or third wafer) with multiple copies of a single, monolithic semiconductor die that includes the functionality of the first chiplet and the second chiplet as integrated functional blocks within the single, monolithic semiconductor die.

Process yield of single, monolithic dies on a silicon wafer is lower than process yield of smaller chiplets on a separate silicon wafer. In addition, a semiconductor process can be adapted for the particular type of chiplet being fabricated. With single, monolithic dies, each die on the wafer is formed with the same fabrication process. However, it is possible that an interface functional block does not require process parameters of a semiconductor manufacturer's expensive process that provides the fastest devices and smallest geometric dimensions. With separate chiplets, designers can add or remove chiplets for particular integrated circuits to readily create products for a variety of performance categories. In contrast, an entire new silicon wafer must be fabricated for a different product when single, monolithic dies are used. It is possible and contemplated that one or more of the processing circuits, the compute circuits, and apparatuses illustrated in FIGS. 1-3 are implemented as chiplets.

Figure 6:
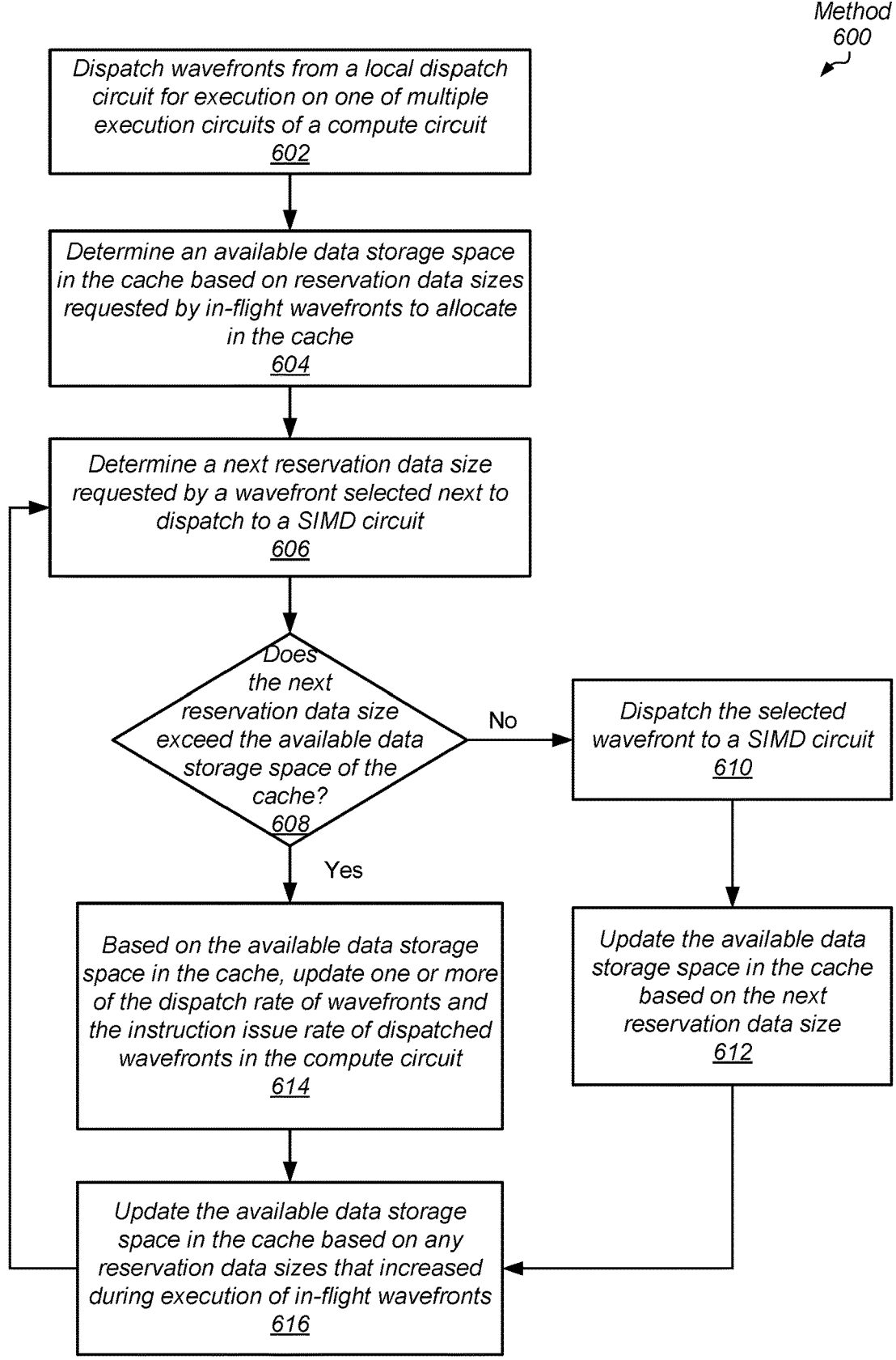
FIG. 6 is a generalized block diagram of a method for efficiently scheduling wavefronts for execution on an integrated circuit.

In some implementations, the hardware of the processing circuits and the apparatuses illustrated in FIGS. 1 and 6 is provided in a two-dimensional (2D) integrated circuit (IC) with the dies placed in a 2D package. In other implementations, the hardware is provided in a three-dimensional (3D) stacked integrated circuit (IC). A 3D integrated circuit includes a package substrate with multiple semiconductor dies (or dies) integrated vertically on top of it. Utilizing three-dimensional integrated circuits (3D ICs) further reduces latencies of input/output signals between functional blocks on separate semiconductor dies. It is noted that although the terms "left," "right," "horizontal," "vertical," "row," "column," "top," and "bottom" are used to describe the hardware, the meaning of the terms can change as the integrated circuits are rotated or flipped.

Regarding the methods 500-900 (of FIGS. 5-9), a computing system includes a first processing circuit and a second processing circuit. In some implementations, the first processing circuit has a general-purpose microarchitecture, and the second processing circuit is a parallel data processing circuit with a highly parallel data microarchitecture. The parallel data processing circuit includes multiple, replicated compute circuits, each with one or more execution circuits. Each execution circuit includes multiple lanes of execution for executing a wavefront. Therefore, each compute circuit executes one or more wavefronts. The first processing circuit compiles a highly parallel data application, which translates instructions of function calls to commands particular to the hardware of the executing circuits of the compute circuits.

Figure 5:
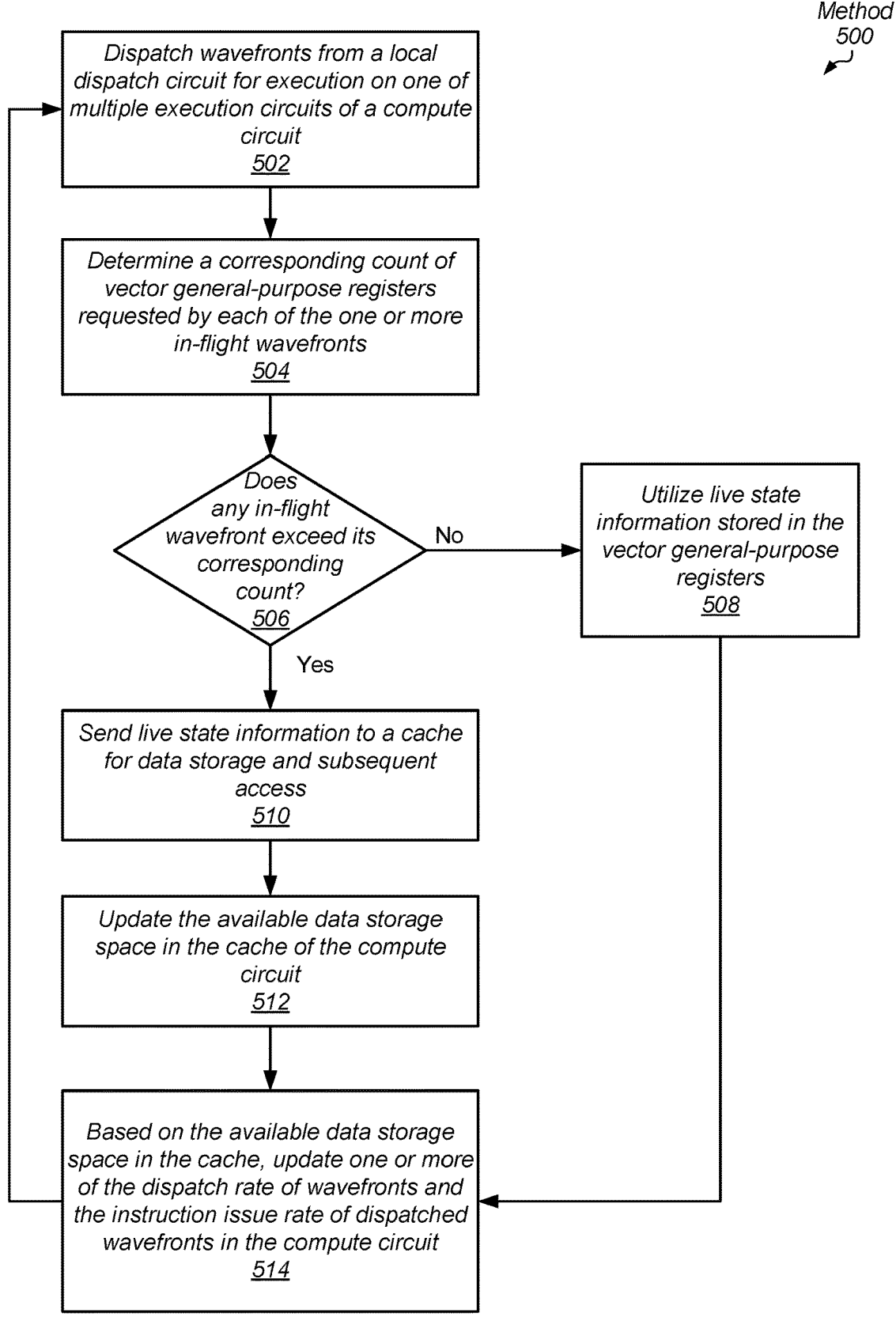
FIG. 5 is a generalized block diagram of a method for efficiently scheduling wavefronts for execution on an integrated circuit.

In addition to the execution circuits, each compute circuit includes a local dispatch circuit that includes a queue for storing multiple wavefronts before the wavefronts are dispatched to the parallel lanes of execution of the execution circuits. Additionally, each compute circuit includes a local cache used to store temporary data that cannot fit for storage in the vector general-purpose register file of the compute circuit. An example of the temporary data is stack data of a function call used by each wavefront generated based on the function call. Each compute circuit also includes a control circuit that monitors the available data storage space in the cache. Referring to FIG. 5, a generalized block diagram is shown of a method 500 for efficiently scheduling wavefronts for execution on an integrated circuit. For purposes of discussion, the steps in this implementation (as well as FIGS. 6-9) are shown in sequential order. However, in other implementations some steps occur in a different order than shown, some steps are performed concurrently, some steps are combined with other steps, and some steps are absent.

A control circuit of a compute circuit dispatches wavefronts from a local dispatch circuit for execution on one of multiple execution circuits (block 502). In some implementations, each of the multiple execution circuits is a single-instruction, multiple-data (SIMD) circuit with multiple lanes of execution and each lane executes a thread of a wavefront. The control circuit determines a corresponding count of vector general-purpose registers requested by each of the one or more in-flight wavefronts (block 504). The count of vector general-purpose registers is an estimation or prediction of an amount of live state information that will be generated by a corresponding one of the one or more in-flight wavefronts. In an implementation, the live state information is temporary stack data of the corresponding one of the one or more in-flight wavefronts. This estimation is used to assign and allocate, to the corresponding one of the one or more in-flight wavefronts, a number of vector general-purpose registers equal to the count. In some implementations, the count is a positive, non-zero integer. In other implementations, the count is an indication specifying a data size such as a number of bytes.

If no in-flight wavefront exceeds its corresponding count ("no" branch of the conditional block 506), then the assigned execution circuit utilizes live state information stored in the vector general-purpose registers (block 508). Afterward, control flow of method 500 moves to block 514 where, based on at least the available data storage space in the cache, the control circuit updates, if needed, the dispatch rate of pending wavefronts from the local dispatch circuit and updates the instruction issue rate of a dispatched wavefront to an execution circuit. In various implementations, the control circuit performs these updates using the same functionality as the control circuit 105 (of FIG. 1), the control circuits 232A-232N (of FIG. 2), control circuit 310 (of FIG. 3), and apparatus 400 (of FIG. 4). For example, the control circuit selects wavefronts and reduces one or more of the dispatch rate of selected pending wavefronts and the instruction issue rate of selected, dispatched wavefronts based on selection criteria. As described earlier, examples of the selection criteria are a priority level, an age of wavefronts, a barrier of workgroups, a granularity of workgroups, a round-robin manner, and so forth.

It is possible that while executing, one or more in-flight wavefronts generate an amount of live state information (e.g., stack data) that exceeds a corresponding original estimation. Therefore, the in-flight wavefront has generated live state information that can be stored in the assigned and allocated vector general-purpose registers, and this in-flight wavefront has also generated additional live state information that cannot be stored in the assigned and allocated vector general-purpose registers. If any in-flight wavefront exceeds its corresponding count ("yes" branch of the conditional block 506), then the control circuit sends live state information to a cache for data storage and subsequent access (block 510). The live state information being sent to the cache is the additional live state information that cannot be stored in the assigned and allocated vector general-purpose registers.

In some implementations, the cache is a local cache within the compute circuit. In other implementations, the cache is an allocated portion of an external cache shared by the multiple compute circuits of a parallel data processing circuit. The control circuit also updates the available data storage space in the cache (block 512). Based on the available data storage space in the cache, the control circuit updates one or more of the dispatch rate of wavefronts and the instruction issue rate of dispatched wavefronts in the compute circuit (block 514). Further details of these steps are provided in the upcoming description of methods 600-

900 (of FIGS. 6-9). Afterward, control flow of method 500 returns to block 502 where the control circuit dispatches wavefronts from a local dispatch circuit for execution on one of multiple execution circuits.

Turning now to FIG. 6, a generalized block diagram is shown of a method 600 for efficiently scheduling wavefronts for execution on an integrated circuit. A control circuit of a compute circuit dispatches wavefronts from a local dispatch circuit for execution on one of multiple execution circuits (block 602). The control circuit determines an available data storage space in the cache based on reservation data sizes requested by in-flight wavefronts to allocate in the cache (block 604). The control circuit determines the next reservation data size requested by a wavefront selected next to dispatch to an execution circuit such as a SIMD circuit (block 606).

If the next reservation data size does not exceed the available data storage space of the cache ("no" branch of the conditional block 608), then the control circuit sends control signals to the local dispatch circuit to dispatch the selected wavefront to a SIMD circuit (block 610). The control circuit updates the available data storage space in the cache based on the next reservation data size (block 612). Afterward, control flow of method 600 moves to block 616 where the control circuit updates the available data storage space in the cache based on any reservation data sizes that increased during execution of in-flight wavefronts.

If the next reservation data size exceeds the available data storage space of the cache ("yes" branch of the conditional block 608), then based on the available data storage space in the cache, the control circuit updates one or more of the dispatch rate of wavefronts and the instruction issue rate of dispatched wavefronts in the compute circuit (block 614). The control circuit updates the available data storage space in the cache based on any reservation data sizes that increased during execution of in-flight wavefronts (block 616). Afterward, control flow of method 600 returns to block 606 where the control circuit determines the next reservation data size requested by a wavefront selected next to dispatch from the dispatch circuit.

Figure 7:
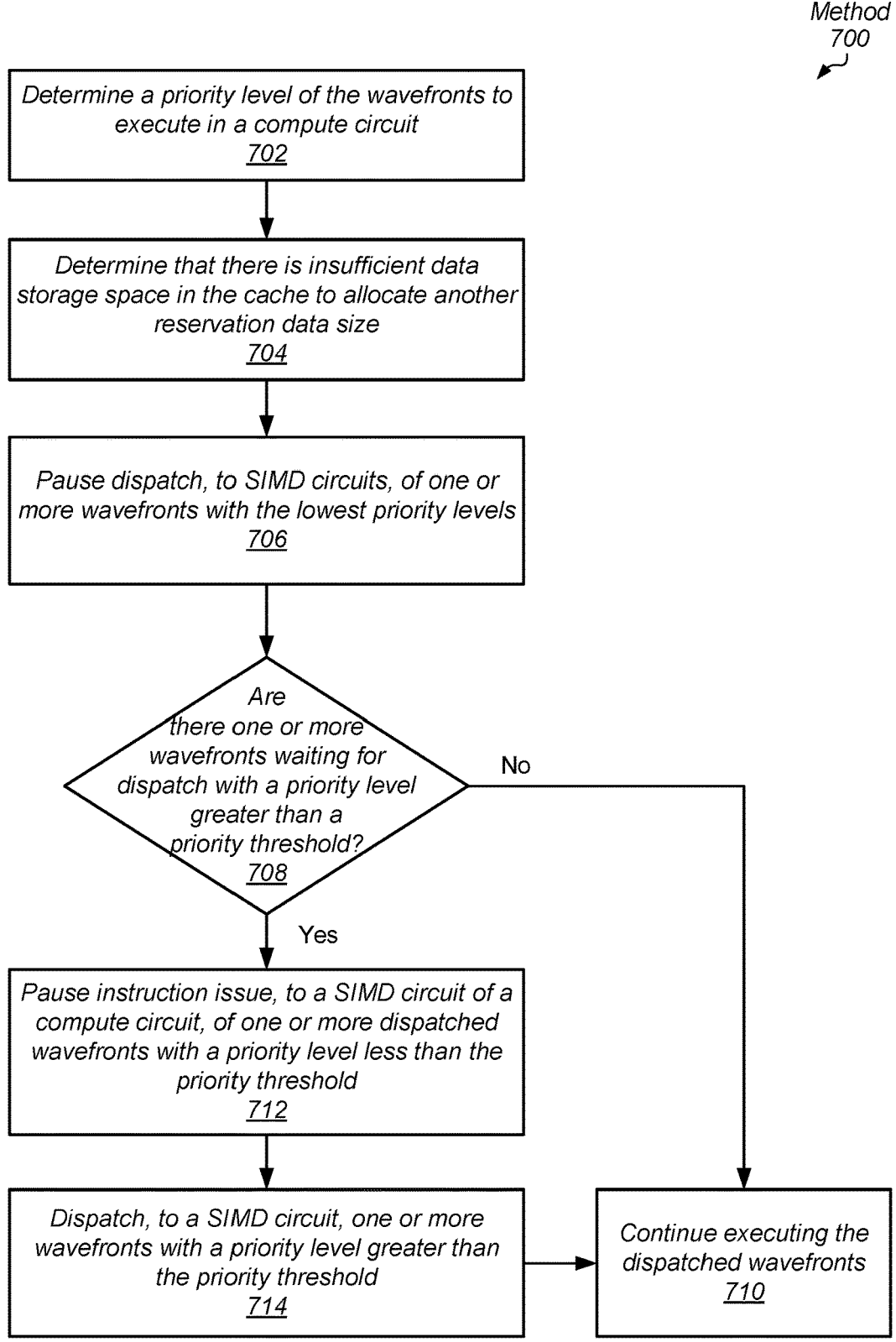
FIG. 7 is a generalized block diagram of a method for efficiently scheduling wavefronts for execution on an integrated circuit.

Referring to FIG. 7, a generalized block diagram is shown of a method 700 for efficiently scheduling wavefronts for execution on an integrated circuit. A control circuit of a compute circuit determines a priority level of the wavefronts to execute in the compute circuit (block 702). A corresponding priority level of a wavefront is based on one or more of an age of the wavefront, a quality of service (QOS) parameter of the wavefront, a corresponding reservation data size of the wavefront, a ratio of the corresponding reservation data size to the available data storage space in the cache, an application identifier or type, such as a real-time application, and so forth. In some implementations, the priority level is already generated, and an indication of the priority level is already stored with the corresponding wavefront. The control circuit determines that there is insufficient data storage space in the cache to allocate another reservation data size (block 704). The control circuit pauses dispatch, to SIMD circuits, of one or more wavefronts with the lowest priority levels (block 706).

If there are no wavefronts waiting for dispatch to SIMD circuits with a priority level greater than a priority threshold ("no" branch of the conditional block 708), then the compute circuit continues executing the dispatched wavefronts using the SIMD circuits (block 710). If there are one or more wavefronts waiting for dispatch to SIMD circuits with a priority level greater than a priority threshold ("yes" branch of the conditional block 708), then the control circuit sends control signals to the corresponding SIMD circuits to pause instruction issue of one or more dispatched wavefronts with a priority level less than the priority threshold (block 712). The local dispatch circuit dispatches, to a selected SIMD circuit, one or more wavefronts with a priority level greater than the priority threshold (block 714). Afterward, control flow of method 700 moves to block 710 where the compute circuit continues executing the dispatched wavefronts using the SIMD circuits.

Figure 8:
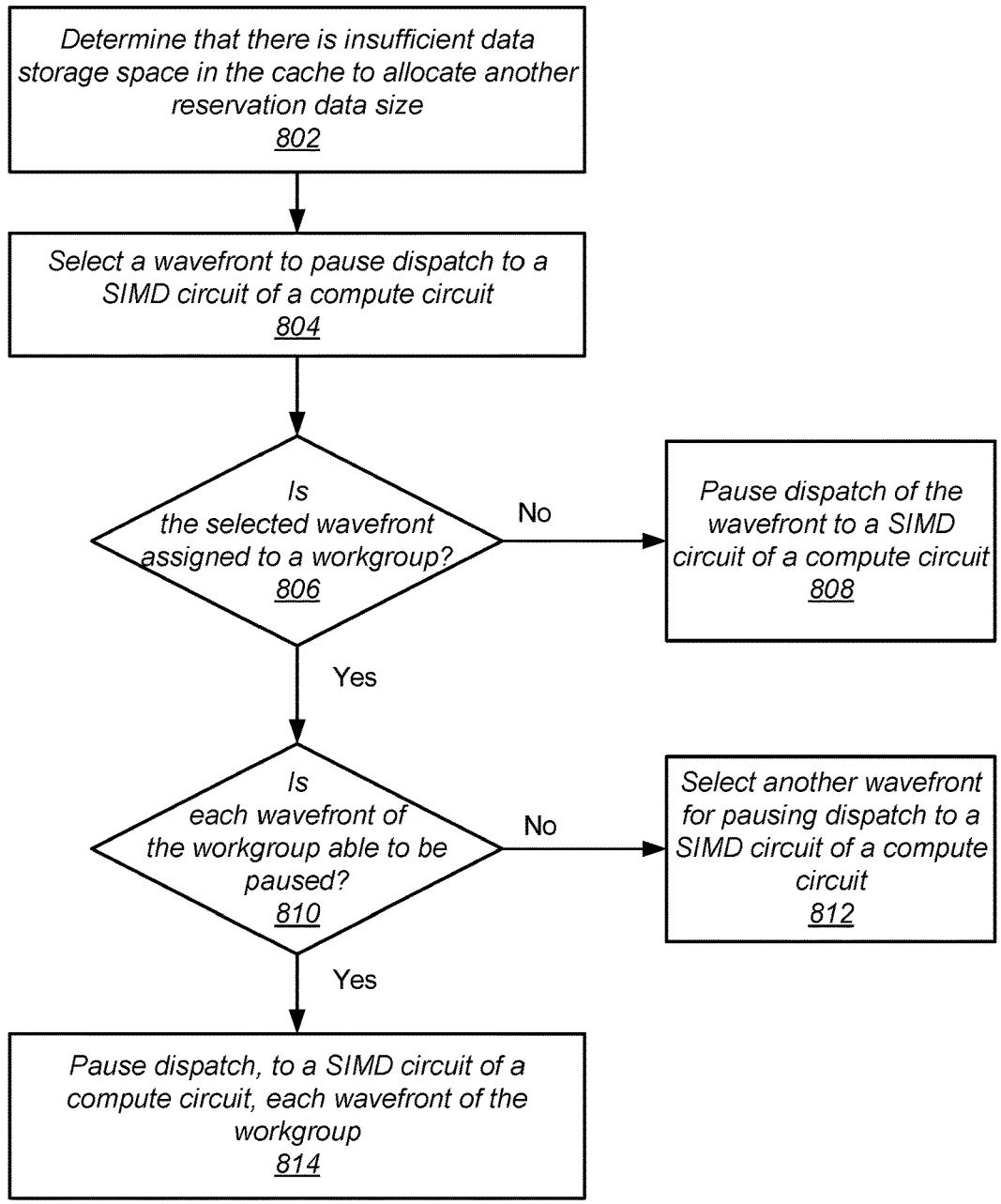
FIG. 8 is a generalized block diagram of a method for efficiently scheduling wavefronts for execution on an integrated circuit.

Turning now to FIG. 8, a generalized block diagram is shown of a method 800 for efficiently scheduling wavefronts for execution on an integrated circuit. A control circuit of a compute circuit determines that there is insufficient data storage space in the cache to allocate another reservation data size (block 802). The control circuit selects a wavefront to pause dispatch to a SIMD circuit of the compute circuit (block 804). If the selected wavefront is not assigned to a workgroup ("no" branch of the conditional block 806), then the control circuit sends control signals to the local dispatch circuit to pause dispatch of the wavefront to a SIMD circuit of a compute circuit (block 808).

If the selected wavefront is assigned to a workgroup ("yes" branch of the conditional block 806), and each wavefront of the workgroup is unable to be paused ("no" branch of the conditional block 810), then the control circuit selects another wavefront for pausing dispatch to a SIMD circuit of the compute circuit (block 812). If the selected wavefront is assigned to a workgroup ("yes" branch of the conditional block 806), and each wavefront of the workgroup is able to be paused ("yes" branch of the conditional block 810), then the control circuit sends control signals to the local dispatch circuit to pause dispatch, to a SIMD circuit of a compute circuit, each wavefront of the workgroup (block 814).

Figure 9:
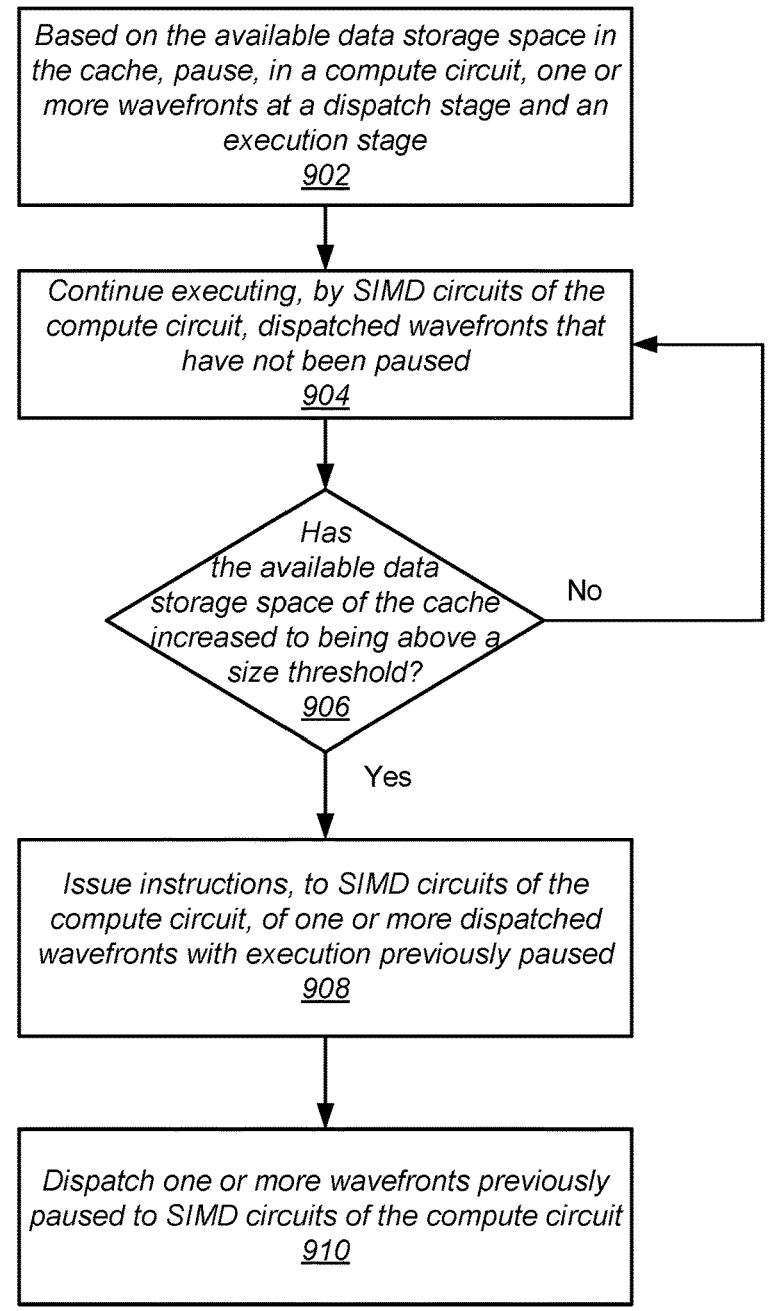
FIG. 9 is a generalized block diagram of a method for efficiently scheduling wavefronts for execution on an integrated circuit.

Referring to FIG. 9, a generalized block diagram is shown of a method 900 for efficiently scheduling wavefronts for execution on an integrated circuit. Based on the available data storage space in the cache, a control circuit of a compute circuit sends control signals to pause, in the compute circuit, one or more wavefronts at a dispatch stage and an execution stage (block 902). The SIMD circuits of the compute circuit continue executing dispatched wavefronts that have not been paused (block 904). If the available data storage space of the cache has not increased to being above a size threshold ("no" branch of the conditional block 906), then control flow of method 900 returns to block 904 where the SIMD circuits of the compute circuit continue executing dispatched wavefronts that have not been paused.

If the available data storage space of the cache has increased to being above a size threshold ("yes" branch of the conditional block 906), then the control circuit sends control signals to the SIMD circuits of the compute circuit to issue instructions of one or more dispatched wavefronts with execution previously paused (block 908). The control circuit sends control signals to the local dispatch circuit to dispatch one or more wavefronts previously paused to SIMD circuits of the compute circuit (block 910).

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   circuitry configured to:
      receive, from a plurality of wavefronts waiting to be dispatched, requests to reserve storage space in a cache; and
      reduce a dispatch rate of a first set of wavefronts of the plurality of wavefronts in response to an available amount of data storage space in the cache being less than a reservation data size of a first wavefront of the plurality of wavefronts.

2. The apparatus as recited in claim 1, wherein in further response to the available amount of data storage space in the cache being less than the reservation data size of the first wavefront, the circuitry is further configured to reduce an instruction issue rate of a second set of wavefronts that have already been dispatched.

3. The apparatus as recited in claim 2, wherein to reduce the dispatch rate and the instruction issue rate, the circuitry is further configured to pause dispatching the first set of wavefronts and pause issuing instructions of the second set of wavefronts.

4. The apparatus as recited in claim 2, wherein the circuitry is further configured to select the first set of wavefronts and the second set of wavefronts, in response to each of the first set and the second set of wavefronts being assigned to a same workgroup.

5. The apparatus as recited in claim 2, wherein the circuitry is further configured to select the first set of wavefronts and the second set of wavefronts, in response to each of the first set and the second set of wavefronts having a priority level below a priority level threshold.

6. The apparatus as recited in claim 2, wherein the circuitry is further configured to increase one or more of the dispatch rate of the first set of wavefronts and the instruction issue rate of the second set of wavefronts, in response to the available amount of data storage space in the cache being greater than the reservation data size of the first wavefront.

7. The apparatus as recited in claim 1, wherein the reservation data size of the first wavefront of the plurality of wavefronts is different from a reservation data size of a second wavefront of the plurality of wavefronts.

8. A method, comprising:
   receiving, from a plurality of wavefronts waiting to be dispatched, requests to reserve storage space in a cache; and
   reducing, by a control circuit, a dispatch rate of a first set of wavefronts of the plurality of wavefronts in response to an available amount of data storage space in the cache being less than a reservation data size of a first wavefront of the plurality of wavefronts.

9. The method as recited in claim 8, wherein in further response to the available amount of data storage space in the cache being less than the reservation data size of the first wavefront, the method comprises reducing, by the control circuit, an instruction issue rate of a second set of wavefronts that have already been dispatched.

10. The method as recited in claim 9, wherein to reduce the dispatch rate and the instruction issue rate, the method comprises pausing, by the control circuit, dispatching the first set of wavefronts and pausing issuing instructions of the second set of wavefronts.

11. The method as recited in claim 9, further comprising selecting, by the control circuit, the first set of wavefronts and the second set of wavefronts, in response to each of the first set and the second set of wavefronts being assigned to a same workgroup.

12. The method as recited in claim 9, further comprising selecting, by the control circuit, the first set of wavefronts and the second set of wavefronts, in response to each of the first set and the second set of wavefronts having a priority level below a priority level threshold.

13. The method as recited in claim 9, further comprising increasing, by the control circuit, one or more of the dispatch rate of the first set of wavefronts and the instruction issue rate of the second set of wavefronts, in response to the available amount of data storage space in the cache being greater than the reservation data size of the first wavefront.

14. The method as recited in claim 8, wherein the reservation data size of the first wavefront of the plurality of wavefronts is different from a reservation data size of a second wavefront of the plurality of wavefronts.

15. A computing system comprising:
   a plurality of chiplets, each comprising:
      a cache;
      processing circuitry configured to process tasks of one or more wavefronts of a plurality of wavefronts that store temporary data in the cache; and a control circuit configured to:
receive, from a plurality of wavefronts waiting to be dispatched, requests to reserve storage space in a cache; and
reduce a dispatch rate of a first set of wavefronts of the plurality of wavefronts in response to an available amount of data storage space in the cache being less than a reservation data size of a first wavefront of the plurality of wavefronts.

16. The computing system as recited in claim 15, wherein in further response to the available amount of data storage space in the cache being less than the reservation data size of the first wavefront the control circuit is further configured to reduce an instruction issue rate of a second set of wavefronts that have already been dispatched.

17. The computing system as recited in claim 16, wherein to reduce the dispatch rate and the instruction issue rate, the control circuit is further configured to pause dispatching of the first set of wavefronts and pause issuance of instructions of the second set of wavefronts.

18. The computing system as recited in claim 16, wherein the control circuit is further configured to select the first set of wavefronts and the second set of wavefronts, in response to each of the first set and the second set of wavefronts being assigned to a same workgroup.

19. The computing system as recited in claim 16, wherein the control circuit is further configured to select the first set of wavefronts and the second set of wavefronts, in response to each of the first set and the second set of wavefronts having a priority level below a priority level threshold.

20. The computing system as recited in claim 16, wherein the control circuit is further configured to increase one or more of the dispatch rate of the first set of wavefronts and the instruction issue rate of the second set of wavefronts, in response to the available amount of data storage space in the cache having increased to being greater than the reservation data size of the first wavefront.

* * * * *